United States Patent [19]

Yamashina et al.

[11] Patent Number: 5,669,017
[45] Date of Patent: Sep. 16, 1997

[54] LENS-FITTED PHOTOGRAPHIC FILM UNIT HAVING AN ACCESS OPENING FORMED IN FRONT COVER TO MOVE A SWINGABLE SHUTTER BLADE

[75] Inventors: Yasuhiro Yamashina; Kazuo Itakura; Yukihiko Yamaguchi, all of Kanagawa, Japan

[73] Assignee: Fuji Photo Film Co., Ltd., Kanagawa, Japan

[21] Appl. No.: 734,698

[22] Filed: Oct. 21, 1996

Related U.S. Application Data

[62] Division of Ser. No. 973,624, Nov. 9, 1992.

[30] Foreign Application Priority Data

| Nov. 7, 1991 | [JP] | Japan | 3-291763 |
| Jan. 9, 1992 | [JP] | Japan | 4-2450 |

[51] Int. Cl.$^6$ ............................. G03B 17/02; G03B 17/38
[52] U.S. Cl. ........................... 396/6; 396/502; 396/535
[58] Field of Search ........................ 396/6, 439, 452, 396/493, 502, 503, 535

[56] References Cited

U.S. PATENT DOCUMENTS

| 4,334,752 | 6/1982 | Johnson et al. | 396/535 |
| 4,954,857 | 9/1990 | Mochida et al. | 396/6 |
| 5,047,792 | 9/1991 | Asano et al. | 396/61 |
| 5,181,057 | 1/1993 | Takagi et al. | 396/6 X |

*Primary Examiner*—Safet Metjahic
*Assistant Examiner*—J. K. Han
*Attorney, Agent, or Firm*—Young & Thompson

[57] ABSTRACT

A lens-fitted film unit has a main body and front and rear covers attached thereto and sandwiching the main body between them. The main body is preloaded with photographic film, and provided with a shutter device and a taking lens. The shutter device is constituted of a single shutter blade, a shutter base on which the shutter blade is swingably mounted, a shutter cover disposed in front of the shutter blade, and a coil tension spring for biasing the shutter blade toward a closed position. The coil tension spring has one end connected to a projection on the shutter blade, and the other end connected to a pin on the shutter base. The projection on the shutter blade is received in an opening in the shutter cover. The opening is superposed with an access opening in the front cover, so that the shutter blade can be forcibly shifted from a closed position to an open position when the front cover is attached to the main body. The shutter blade can be held in that open position while the taking lens of the film unit is tested.

The other end of the coil tension spring is mounted on a pin on a forward surface of the main body, and this pin is likewise received in an opening in the shutter cover. Both ends of the spring are thus immune to disengagement under impact.

1 Claim, 10 Drawing Sheets

5,669,017

LENS-FITTED PHOTOGRAPHIC FILM UNIT HAVING AN ACCESS OPENING FORMED IN FRONT COVER TO MOVE A SWINGABLE SHUTTER BLADE

This application is a division of copending application Ser. No. 07/973,624, filed Nov. 9, 1992.

BACKGROUND OF THE INVENTION

1. Field of the Invention

The present invention relates to a lens-fitted film unit, and more particularly to such a unit having a shutter device having a single swingable shutter blade of a kick-away type wherein one end portion of the blade is kicked away to open and close the shutter aperture.

2. Description of the Related Art

Inexpensive lens-fitted film units are sold widely. Such a unit has a film preloaded in the factory, and is returned to a photofinisher for development after all the frames have been exposed. The user is therefore not required to load the film or unload it after photographing.

A shutter device of the so-called kick-away type is used with such a lens-fitted film unit, as disclosed in U.S. Pat. No. 4,954,857 (corresponding to Japanese Patent Publ. (JP-B) No. 2-32615). In this shutter device, a single shutter blade is mounted swingably on a shutter base. The shutter blade is urged by a coil tension spring toward a closed position wherein the shutter aperture is light-shield. When photographing, the shutter button releases a cocked shutter drive lever. When the shutter drive lever is moved by a strong spring force, a kick-away arm of the shutter drive lever kicks away a claw of the shutter blade. The shutter blade then swings approximately at a constant speed against the relatively weak force of the coil tension spring to open the shutter aperture. When the shutter blade reaches the position wherein the shutter aperture is fully open, the kick-away arm rides over and passes the claw of the shutter blade. Thereafter, the shutter blade returns to the closed position by the force of the coil tension spring. The shutter blade is thus actuated at a fixed shutter speed, e.g. 1/125 second. The shutter drive lever is, in response to film winding, reset to the cocked position. The kick-away arm formed integrally with the shutter drive lever follows an arcuate path while it rides over and passes the claw.

In the process of manufacturing the same lens-fitted film unit, there is a step of inspecting its optical system. The lens as mounted is examined for eccentricity of position and the degree to which the optical axis of the lens departs from the intended optical axis. This inspection is carried out at an assembly stage wherein the main body of the film unit has been provided with a front cover attached thereto but has not yet been loaded with the film. Inspection light is shone on the lens and passes through it. The in-focus position of the inspection light is detected by a CCD sensor situated in an exposure station of the main body. To keep the shutter blade from hindering inspection, the shutter aperture is opened by actuating the shutter blade during inspection. There is, however, a problem in that such inspection is difficult. Even though utilized for lens inspection, the shutter device is adapted to actuate the shutter blade to open at a predetermined shutter speed, or for a predetermined duration suitable for taking a photograph. This limited duration of opening the shutter aperture is too short for the step of inspecting the lens.

For the manual assembly of the shutter device described above, the shutter blade 90 is formed with a hook 91 having a long sharp edge 91a as shown in FIG. 14 of the accompanying drawings. Since the hook 91 has such a long sharp edge 91a, the circular end portion 92a of the coil spring 92 is hard to disengage from the hook 91. For the automatic assembly of the shutter device described above, the shutter blade 90 is formed with a hook 93 with a short sharp edge as shown in FIG. 15, to allow an easy attachment of the end portion 92a of the coil spring 92 to the hook 93. In the case of the hook 91 with the long sharp edge 91a, it is necessary to expand the coil spring 92 over the sharp edge 91a of the hook 91 before coupling the end portion 92a to the hook 91. If this assembly operation is to be automatically preformed, it becomes very complicated. Therefore, the hook 91 is not suitable for the automatic assembly because of the difficulty of the assembly operation. For automatic assembly, however, the length A of the hook 93 is made smaller than the diameter B of the end portion 92a of the spring 92. Reference numeral 94 designates the shutter base, 95 the shutter cover.

In the case of the shutter device shown in FIG. 15 and assembled automatically, the end portion 92a of the coil spring 92 may disengage from the hook 93 when it receives an impact, because of the short length A of the hook 93. In the case of the shutter device shown in FIG. 14, and assembled manually, however, although the end portion 92a will not disengage from the hook 91 of the shutter blade 90, the other end portion 92b may disengage from a pin 96 under an impact.

OBJECTS OF THE INVENTION

It is an object of the present invention to provide a lens-fitted film unit in which the optical system thereof can be inspected for a sufficient period of time.

It is another object of the present invention to provide a lensfitted film unit incorporating a shutter device which is both adaptable to automatic assembly and immune to disengagement of the coil spring under impact.

SUMMARY OF THE INVENTION

The above and other objects are achieved by forming an opening in the front cover mounted in front of the shutter device, so as to render the shutter blade accessible through the same opening in order to actuate the shutter blade.

In a preferred embodiment of the present invention, the shutter device has the shutter blade mounted swingably on a shutter base and a shutter cover attached to the shutter base. In the shutter cover is formed a first arcuate receiving portion, into which a projection on the shutter blade, e.g. a pin or a hook, is inserted. Access is thus provided for a jig, to the projection on the shutter blade, through the opening in the front cover and the first receiving portion, so that it is possible to shift the shutter blade to the open position forcibly and to hold it in the open position for a time suitable to permit inspection of the position of the taking lens.

To bias the shutter blade toward a closed position, an end of a coil tension spring is connected to the projection on the shutter blade. Another end of this coil spring is connected to a projection e.g. a pin formed on the shutter base. The projection on the shutter blade is inserted in the first receiving portion, and the projection on the shutter base is inserted in the second receiving portion of the shutter cover. As these first and second receiving portions, a hole or a recess is provided.

According to another preferred embodiment, the shutter cover has a first fence protruding from the cover so as to cover the path of the distal end of a hook, and a second fence protrudes from the cover so as to cover the distal end of a pin. The height of the fence is such that the distal ends of the hook and pin enter the interior of the fences sufficiently.

According to the present invention, because the shutter device and the front cover are provided with an opening through which the shutter blade is actuable from outside the front cover, the shutter blade can be operated to open when the front cover is attached. The shutter aperture can be kept in the open position for as long as needed to perform the inspection of the optical system in the course of the assembling process. Furthermore, the distal ends of the projections between which the coil spring is extended are encircled by walls provided by the holes, recesses or fences. It is therefore possible to prevent the end portion of the coil tension spring from disengaging from the projection. Furthermore, it is possible to make the projection such as a hook smaller than the inner diameter of the end portion of the coil spring, making feasible an automatic assembly.

BRIEF DESCRIPTION OF THE DRAWINGS

The above and other objects and advantages of the invention will become apparent from the following detailed description of preferred embodiments when read in conjunction with the accompanying drawings, wherein.

DETAILED DESCRIPTION OF THE PREFERRED EMBODIMENTS

Figure 1:
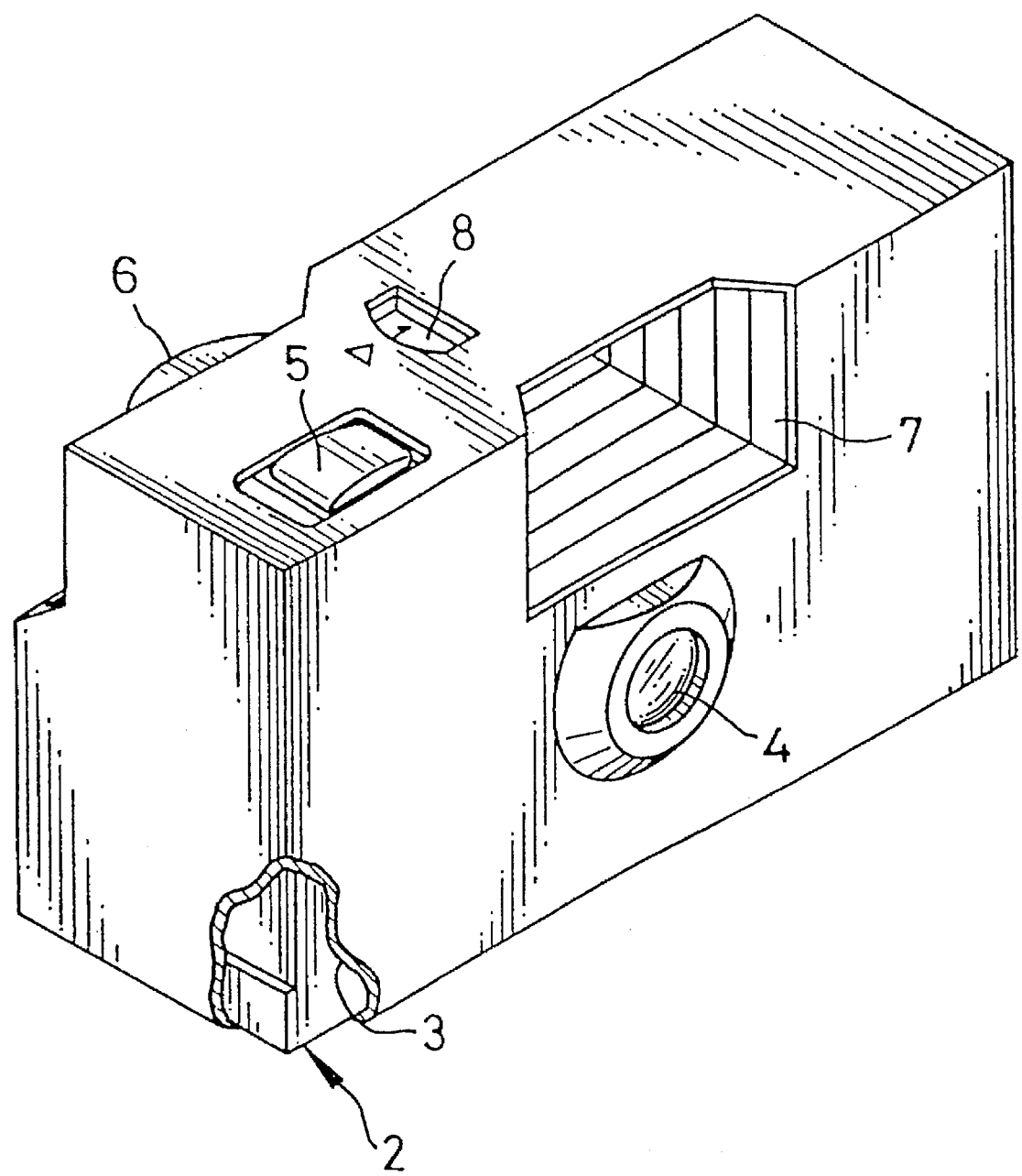
FIG. 1 is a perspective view of a lens-fitted film unit according to an embodiment of the present invention.

In FIG. 1, illustrating a lens-fitted film unit of the present invention, a film housing 2 is generally molded from plastic and covered by a cardboard casing or carton 3. In the carton 3 are formed openings exposing a taking lens 4, a shutter button 5, a wind-up wheel 6, a viewfinder 7, and a counter window 8 for indicating the number of remaining unexposed frames of the film.

Figure 2:
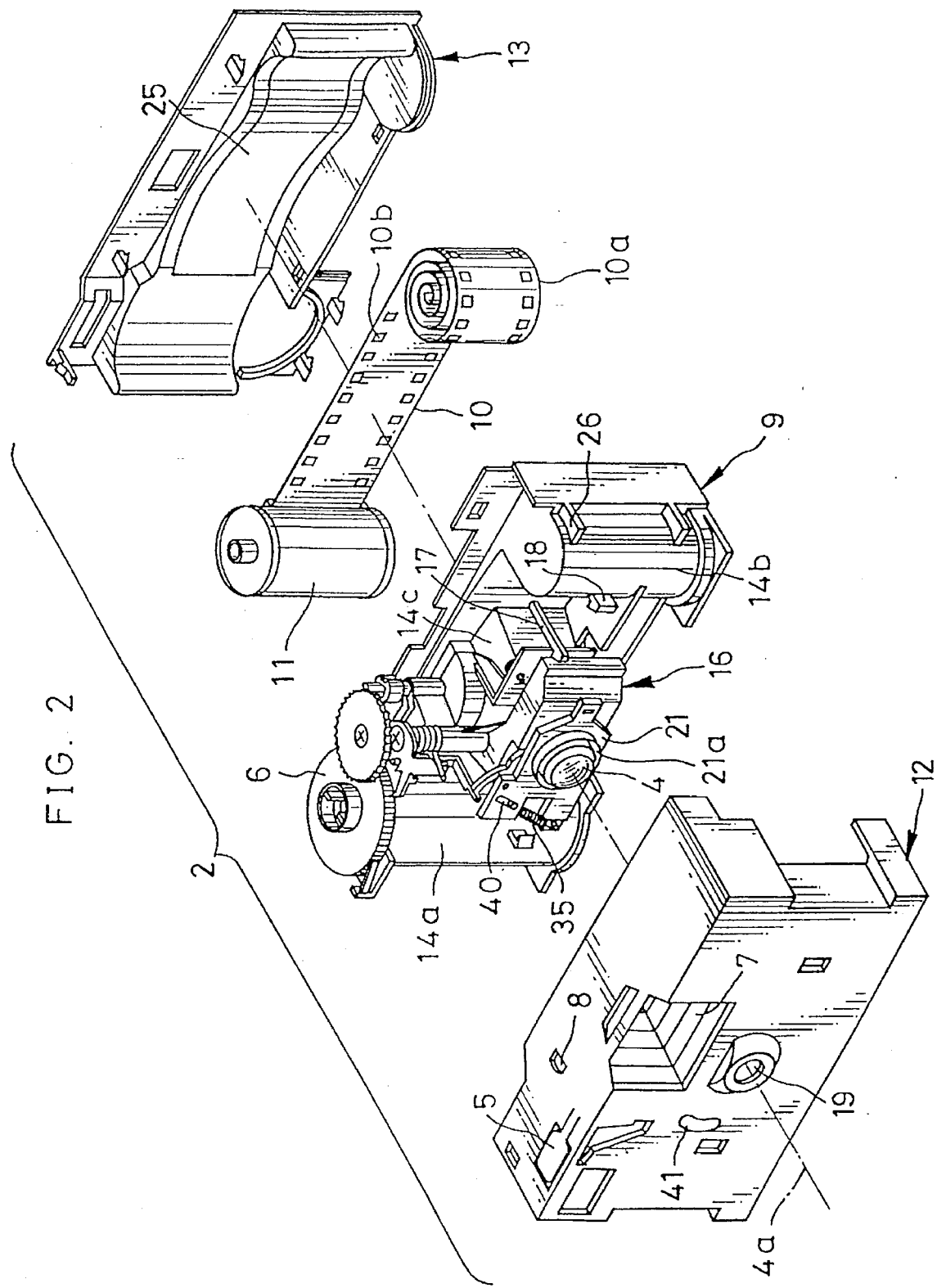
FIG. 2 is an exploded perspective view of the interior of the lens-fitted film unit shown in FIG. 1.

As illustrated in FIG. 2, the film housing 2 is constituted by a main body 9 having a photographic film cassette 11 contained therein, and front and rear covers 12 and 13 attached to the main body 9 to sandwich it between them. In the main body 9 is formed a cassette chamber 14a for containing the cassette 11, a film roller chamber 14b for containing a film roll 10a, which consists of unexposed photographic film 10 draw out of the cassette 11, and an exposure chamber 14c situated between the chambers 14a and 14b. The unexposed film 10 from the cassette 11 extends between the cassette chamber 14a and the roll chamber 14b, supported from behind on a film contact surface 25 formed on the rear cover 13, and thereby set behind the exposure chamber 14c at an appropriate exposure plane.

In front of the exposure chamber 14c is detachably mounted an exposure unit 16 via a retaining claw 17 or the like formed on the main body 9. The front of the main body 9 with the exposure unit 16 is covered by the front cover 12. Light from a subject to be photographed enters an opening 19 in the front cover 12, passes through the taking lens 4 and the exposure unit 16, and falls on the film 10. The taking lens 4 is fitted on a lens holder 21a and is fixedly sandwiched between holder 21a and the front cover 12 with photographic optical axis 4a passing through the center of the taking lens 4. The front cover 12 is retained by a plurality of claws 18 formed on the main body 9. Guide members 26 formed on the main body 9 make it easy to assemble body 9 and cover 12 without positional deviation.

Figure 3:
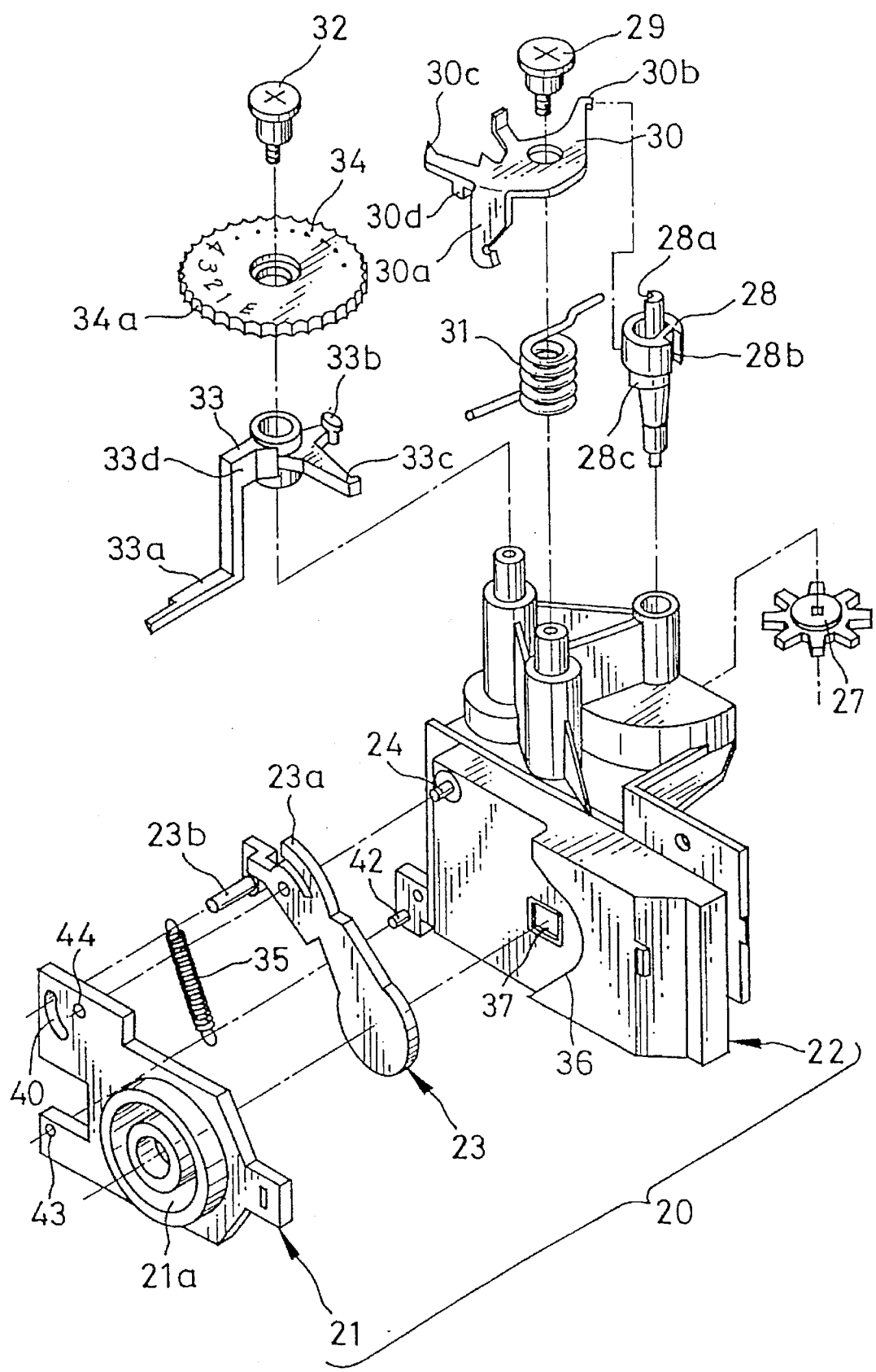
FIG. 3 is an exploded perspective view of the exposure unit shown in FIG. 2.

Referring to FIG. 3, which is an exploded perspective view of the exposure unit 16, the exposure unit 16 is provided with a shutter device 20 of the kick-away type. The shutter device 20 is constituted by a shutter cover 21 having a lens holder 21a, a shutter base 22, a shutter blade 23, and a drive lever 33. The shutter blade 23 is swingably supported on a shaft 24 on the shutter base 22. Behind the shutter base 22 is mounted an eight-toothed driven sprocket 27 to engage with and driven by perforations 10b (see FIG. 2) formed in the photographic film 10. The driven sprocket 27 makes one rotation when the film is advanced one frame. A cam 28 has a lower shaft which is fixedly fitted in the driven sprocket 27, and is rotatable together with the latter as a unit. The upper end of the cam 28 is provided with a notch 28a.

A retaining lever 30 is supported on the shutter base 22 to be rotatable on a shaft on base 22, and is biased clockwise by a spring 31 of which one end is retained on the bent portion 30a of the retaining lever 30. An arm 30b of the lever 30 is in contact with the cylindrical surface of the cam 28, and is disposed in a recess 28b in cam 28 so as to rotate the lever 30 in the clockwise direction upon rotation of cam 28. The rotation of the lever 30 brings a claw 30c into engagement with a tooth on the wind-up wheel 6, so as to stop the film from being wound further. A shutter drive lever 33 is supported on the shutter base 22 for rotation of a shaft on base 22, and is biased counterclockwise by the spring 31 connected to a spring retaining end 33b. On the shutter drive lever 33 is rotatably mounted a counter disk 34, coaxially therewith. The counter disk 34 partly appears within the counter window 8 through the front cover 12. Around the counter disk 34 are formed triangular teeth 34a, which are engaged with the notch 28a of the cam 28. One rotation of the cam 28 causes the counter disk 34 to rotate the angular increment of one tooth.

The shutter drive lever 33 is provided with a kick-away arm 33a, and an arm 33c to contact a cam surface 28c of the cam 28. The arm 33c is so pressed during one rotation of the cam 28 as to move the shutter drive lever 33 from an initial position to a cocked position against the bias of the spring 31. When the release button 5 is depressed, a projection 30d of the retaining lever 30 is disengaged from a surface 33d of the shutter drive lever 33. The bias of the spring 31 causes the shutter drive lever 33 to rotate counterclockwise, so that kick-away arm 33a hits or kicks away a claw 23a formed on an end of the shutter blade 23.

The coil tension spring 35 is connected to a spring receiving projection 23b on the shutter blade 23, and biases the shutter blade 23 counterclockwise or toward the closed state. In the initial state, the shutter blade 23 bears on and is stopped by a stop surface 36, and shields light completely from a shutter aperture 37 formed in the shutter base 22. The shutter aperture 37 is opened when the kick-away arm 33a kicks the claw 23a of the shutter blade 23 as mentioned above. Further rotation of the kick-away arm 33a disengages it from the shutter blade 23, so that the bias of the coil spring 35 causes the shutter blade 23 to close the shutter aperture 37 completely. The duration of opening the shutter aperture 37 is 1/125 second, approximately.

Figure 5:
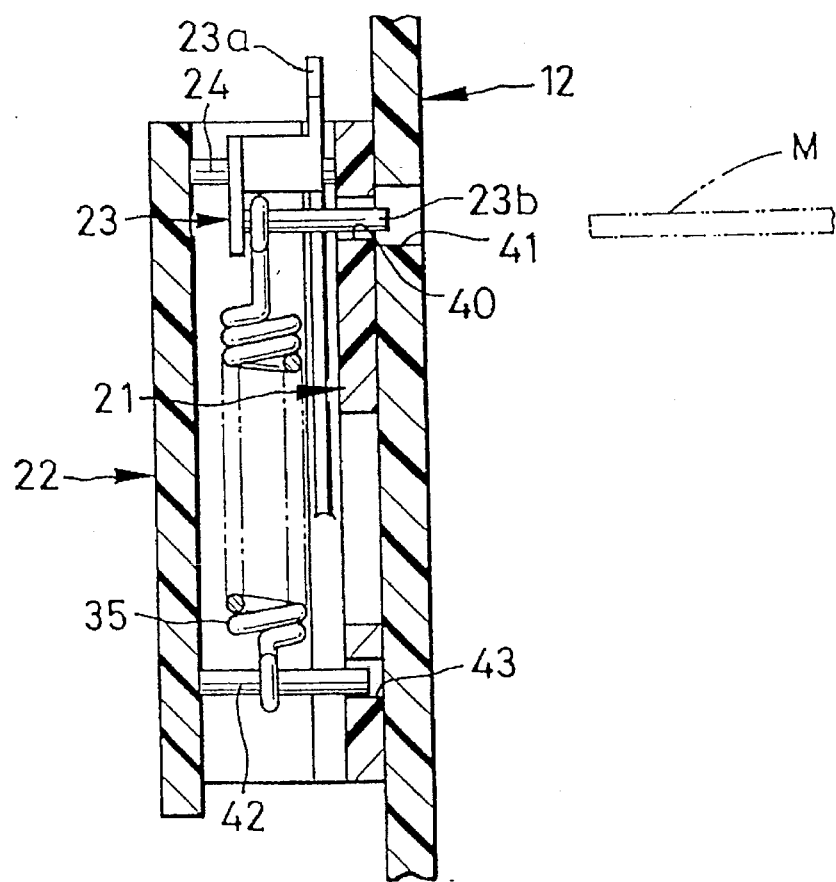
FIG. 5 is a sectional view showing main portions of the present invention.

There is formed on opening 40 in the shutter cover 21 in correspondence with the path along which the receiving projection 23b is swingable while the shutter blades 23 opens/closes the shutter aperture 37. As is illustrated in FIG. 5, the front cover 12 is likewise provided with an opening 41 in a position corresponding to the opening 40 for the purpose of actuating the shutter during inspection. Even after the front cover 12 is attached to the main body 9, the shutter blade 23 is shiftable by inserting a member M such as a jig through the superposed openings 40 and 41. Both openings 40 and 41 are arcuate in correspondence with the path of the spring receiving projection 23. The two openings, alternatively, may have a circular or rectangular shape. Should the front distal end of the projection 23b project beyond the front surface of the front cover 12, there would take place friction between it and the inside of the carton 3 so that the shutter blade 23 would be impeded. The projection 23b, therefore, terminates no farther forward than flush with the front surface of the front cover 12.

As illustrated in FIG. 5, the coil spring 35 is connected between the projection or pin 42 fixed on the shutter base 22 and the projection or pin 23b of the shutter blade 23. The projection 42 is received in a hole 43 formed in the shutter cover 21. The coil spring 35, accordingly, is prevented from disengagement from the projection 23b or 42 even upon generation of vibration, shock or impulse, while being disposed between the shutter base 22 and the shutter cover 21. Because the shaft 24 for supporting the shutter blade 23 is inserted in the hole 44 in the shutter cover 21, the shutter blade 23 will never disengage from the shaft 24.

Figure 6:
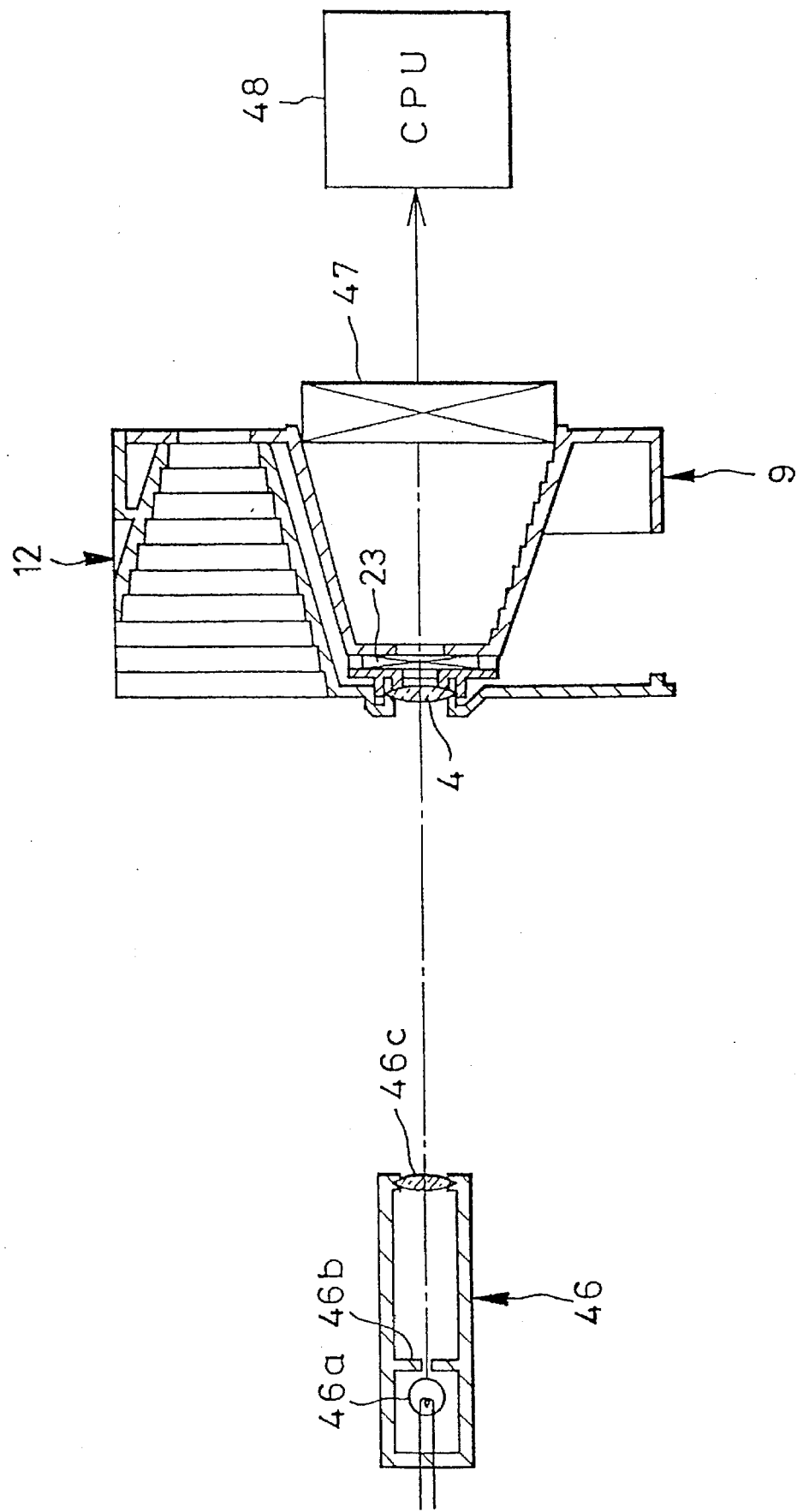
FIG. 6 is an explanatory view showing an inspection step in the course of manufacturing the lens-fitted film unit.

Inspection of the above-constructed lens-fitted film unit is described next with reference to FIG. 6. The inspection of the optical system follows the step of attaching the front cover 12 to the main body 9 with the exposure unit 16 incorporated, during an assembling process. The optical system is inspected for eccentricity of the taking lens 4, position thereof in the axial direction (infinity distance focus adjustment), light amount transmitted through the same, and the like. To do this, a light source 46 is used, constituted by a lamp 46a, a pin hole mask 46b, and a collimator lens 46c, to apply parallel light to the taking lens 4. A CCD sensor 47 is disposed behind the taking lens 4, which detects the beam of light as passed, and outputs a signal corresponding to a focussed position, size, and/or brightness of the incident spot of light, in order to evaluate the signal in a CPU 48.

Figure 4:
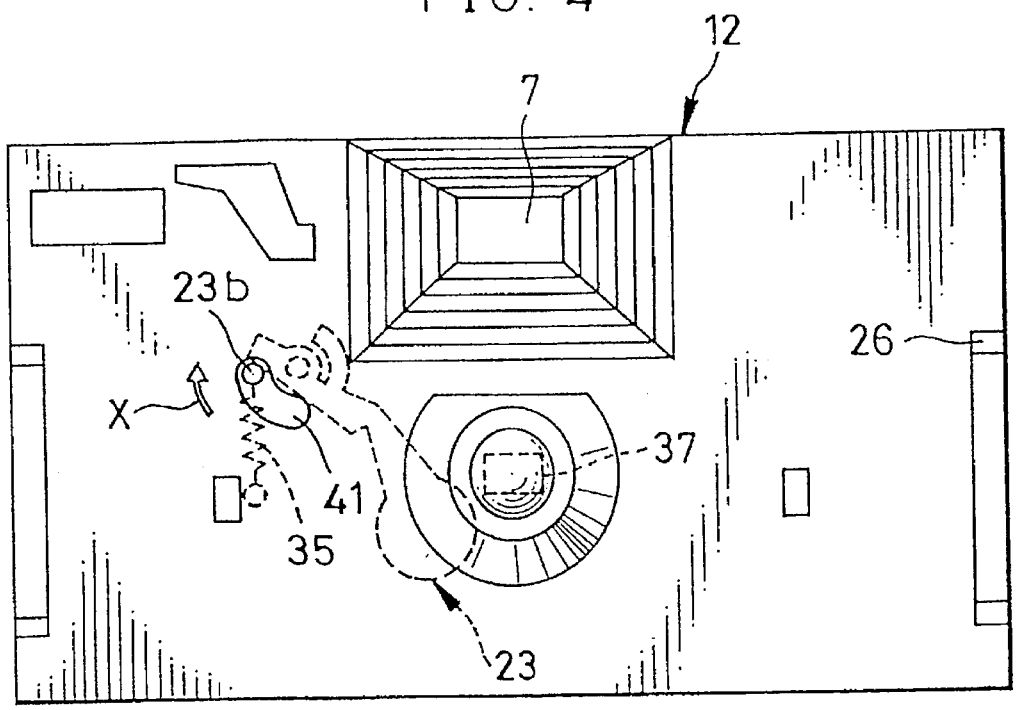
FIG. 4 is a front elevational view of the front cover.

The inspection as above is automatically carried out by conveying a partly assembled body of the lens-fitted film unit (main body 9 with front cover 12) on a conveyor belt. When the partly assembled body to be inspected is conveyed to the vicinity of an inspecting device, the spring receiving projection 23b, which is accessible through the superposed slots 40 and 41, is swung to the position shown in FIG. 4 in order to open the shutter blade 23. For this purpose, a jig or operable member is inserted in the opening 41 and operated to swing projection 23 in the direction of the arrow X in FIG. 4, against the action of spring 35, and for holding it in this open-shutter position during inspection of lens When the shutter blade 23 swings to open the shutter aperture 37 fully, the inspection light from the light source 46 falls on the taking lens 4. The CCD sensor 47 behind the exposure chamber 14c measures the inspection light as passed through the taking lens 4. It is also possible to dispose the CCD sensor 47, alternatively, at the position of the intended focus of the taking lens 4 for measurement of light and hence the detection of proper focus. Data thus obtained in the CCD sensor 47 are sent to the CPU 48, where it is judged whether the eccentricity of the taking lens 4 and the degree to which the taking lens 4 is misaligned with the intended optical axis 4a are within a tolerable range, and whether the light amount is sufficient. When the body thus inspected is determined by the CPU 48 to be defective, then it is removed or withdrawn form the production line. When the body thus inspected is determined to be acceptable, then the projection 23 is released by the jig or operable member, after which the shutter blade 23 returns to the closed state thanks to the bias of the shutter spring 35, to terminate the inspection step.

The acceptable partly assembled body after the inspection step is loaded with the film 10, closed by attachment o the rear cover 13, and covered by the carton 3 to comprise a completed unit. As illustrated in FIG. 1, the opening 41 is completely covered by the carton 3, so that there is no chance that a photographer would inadvertently touch and swing the projection 23 to expose the film 10.

Figure 7:
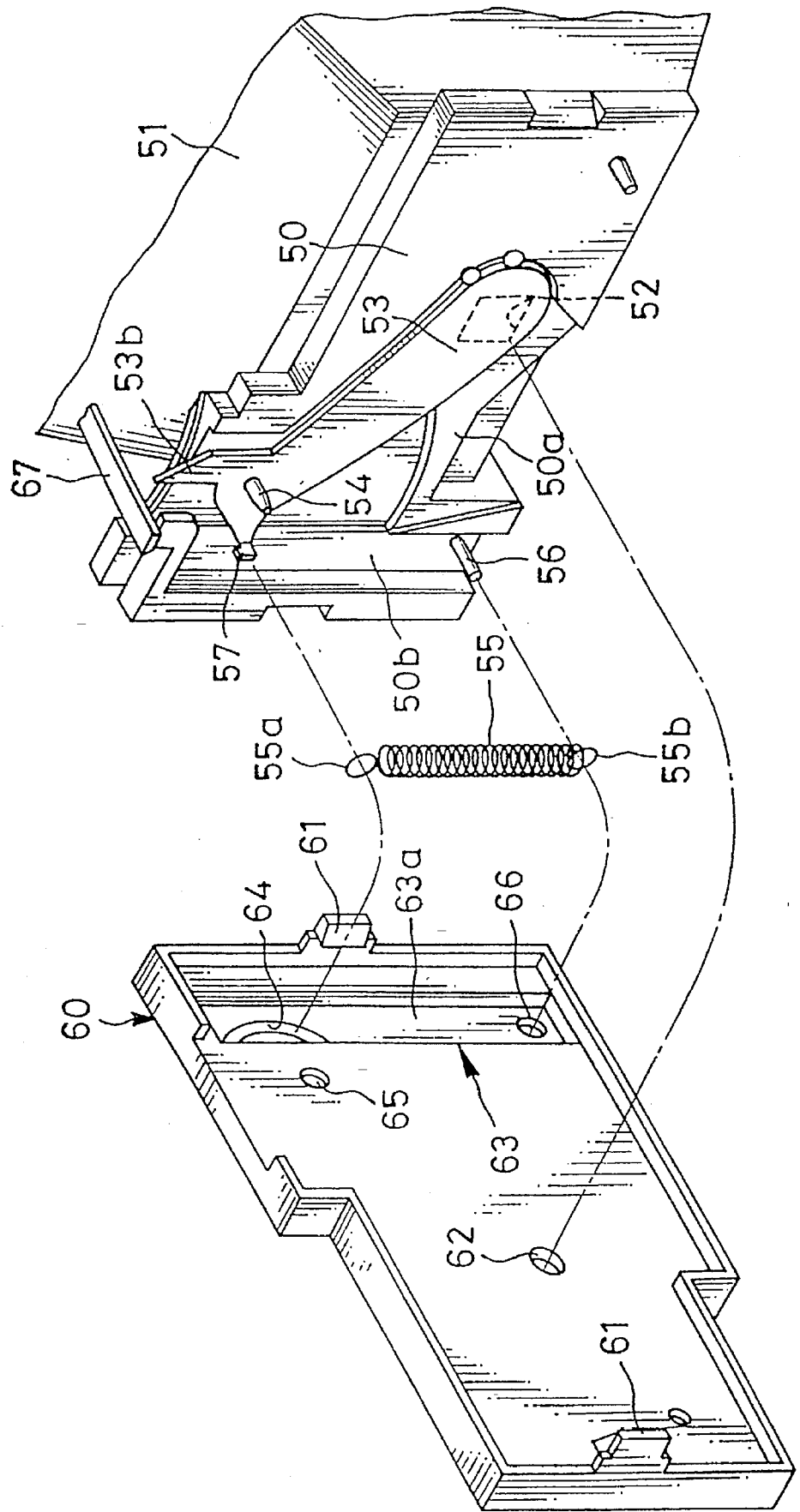
FIG. 7 is an exploded perspective view of a shutter device according to another embodiment of the present invention.
Figure 8:
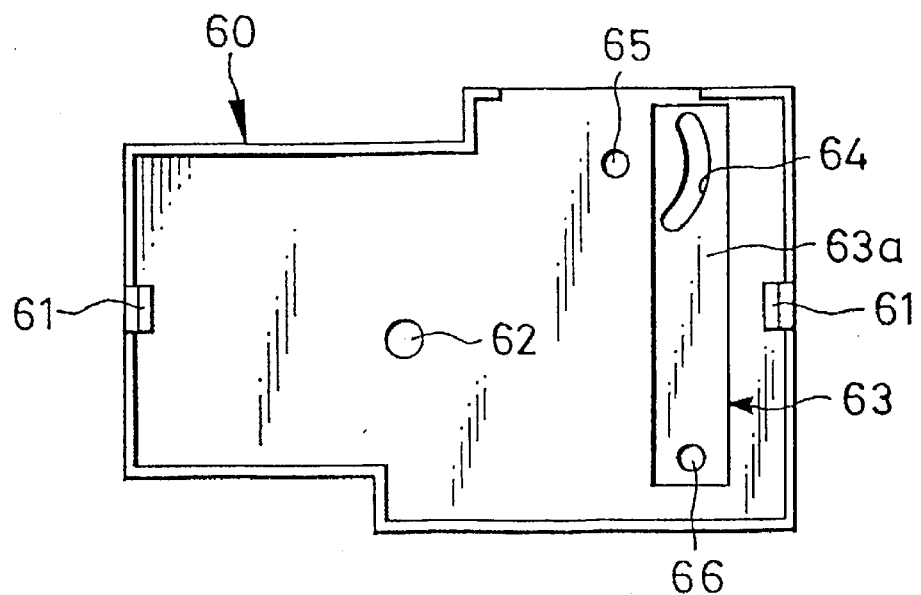
FIG. 8 is a rear view of the shutter cover shown in FIG. 7.
Figure 9:
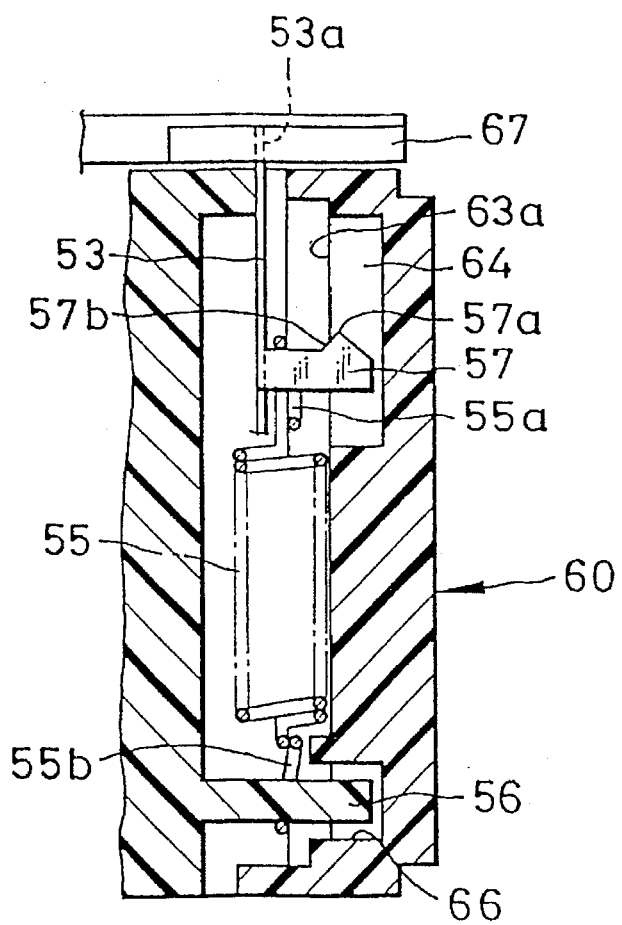
FIG. 9 is a cross-sectional view of the shutter device showing the assembled condition of the coil tension spring.

The embodiment illustrated in FIGS. 7 to 9 is an improvement in which the coil spring connected to the shutter blade is prevented from being disengaged by vibration or shock. A shutter base 50 is formed integrally with the front portion of an exposure chamber 51. A shutter aperture 52 is formed for exposing to light a photographic film loaded in the exposure chamber 51. A shutter blade 53 is mounted swingably on a shaft 54 fixed to the shutter base 50 and swings within a recess 50a formed in the shutter base 50. The shutter blade 53 has a hook 57 protruding therefrom. The height of the hook 57 is less than the inner diameter of the end portion 55a of a coil spring 55. The shutter base 50 is formed with a coil spring housing 50b which is contiguous to the blade housing recess 50a, but is deeper than the recess 50a, and is rectangular with flat side walls. A pin 56 is formed on the surface of the spring housing 50b, an end portion 55b of the coil spring 55 being coupled to the pin 56.

A shutter cover 60 is provided so as to cover the shutter base 50 and be secured to base 50 by means of claws 61, thereby housing the shutter blade 53 and coil spring 55 within the space defined between the cover 60 and shutter base 50. As particularly shown in FIG. 8, the shutter cover 60 is formed with an exposure aperture 62 and a coil spring housing 63 corresponding to the housing 50b formed in the shutter base 50. The coil spring 55 is accommodated within the parallelepipedal space defined by the two housings 50b and 63.

An arcuate groove 64 is formed in a bottom wall 63a of the spring housing 63, the groove 64 having a configuration matching the path of the hook 57 during the open/close operation of the shutter blade 53. The arcuate groove 64 is concentric with a hole 65 in which the shaft 54 is inserted, so as to allow free movement of the shutter blade 53. A circular recess 66 is also formed in the shutter cover 60 to receive the distal end of the pin 56. The width of the groove 64 and the inner diameter of the recess 66 are preferably smaller than the outer diameter of the end portions 55a and 55b of the coil spring 55, thereby preventing the end portions 55a and 55b from entering the groove 64 and recess 66. Reference numeral 67 designates a kick-away arm for kicking the claw 53b.

As particularly shown in FIG. 9, since the sharp edge of the hook 57 is disposed in the groove 64 and the distal end of the pin 56 is disposed in the recess 66, the end portions 55a and 55b of the coil spring 55 will not be disengaged from the hook 57 and pin 56 even when impact is applied to the shutter device. The end portion 55a in particular will not be disengaged from the hook 57 even if it is moved toward the apex of the hook 57 for the coil spring 55 by impact or vibration, because the sharp edge 57a of the hook 57 is housed within the groove 64 and the motion of the end portion 55a is limited by an inclined surface 57b and the bottom surface 63a of the spring housing 63.

Figure 10:
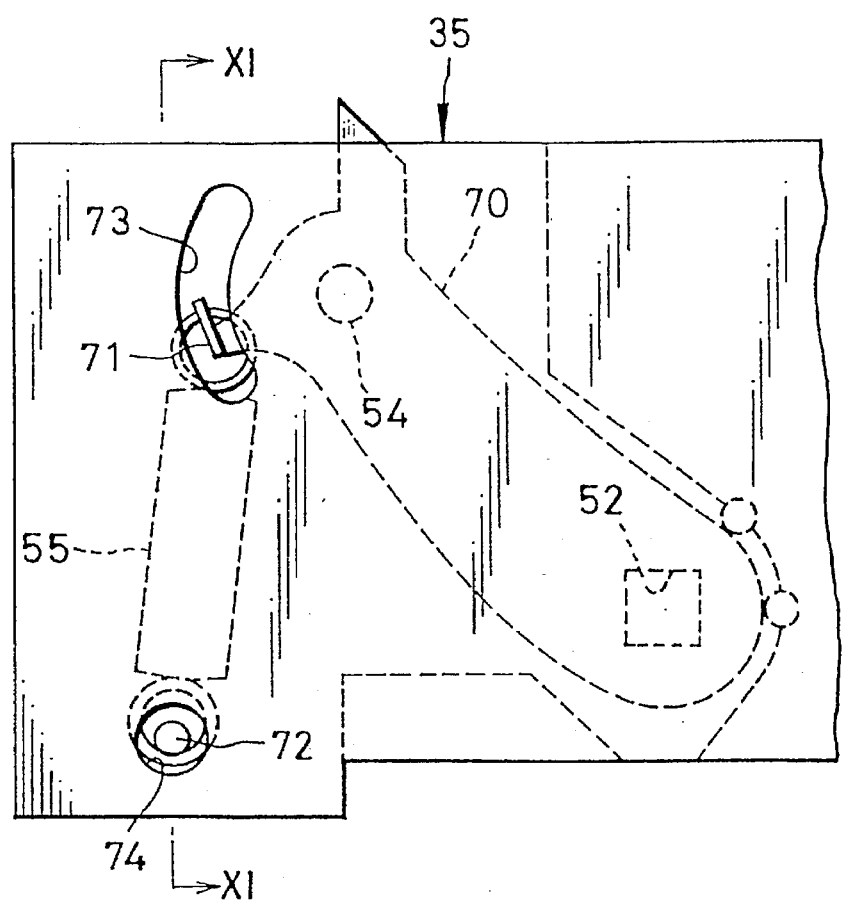
FIG. 10 is a front view of the shutter device according to still another embodiment of the present invention.
Figure 11:
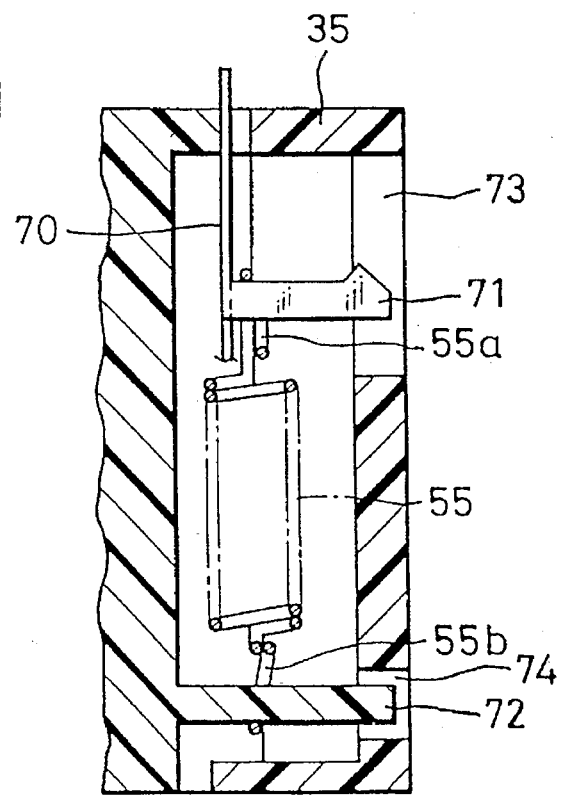
FIG. 11 is a cross sectional view taken along line XI—XI in FIG. 10.

In the above-described embodiment, the groove 64 and recess 66 are formed in the shutter cover 60. In place of these elements, though-holes 73 and 74 may be formed in a shutter cover 35 as shown in FIGS. 10 and 11, in which a hook 71 and pin 72 of a shutter blade 70 are received. The hole 73 which the hook 71 occupies is arcuate and concentric with the axis of the shaft 54 supporting the shutter blade 70, to allow free movement of the shutter blade 70, as in the embodiment of FIGS. 7 to 9. Elements similar to those illustrated in FIGS. 7 to 9 are designated with the identical reference numerals.

Figure 12:
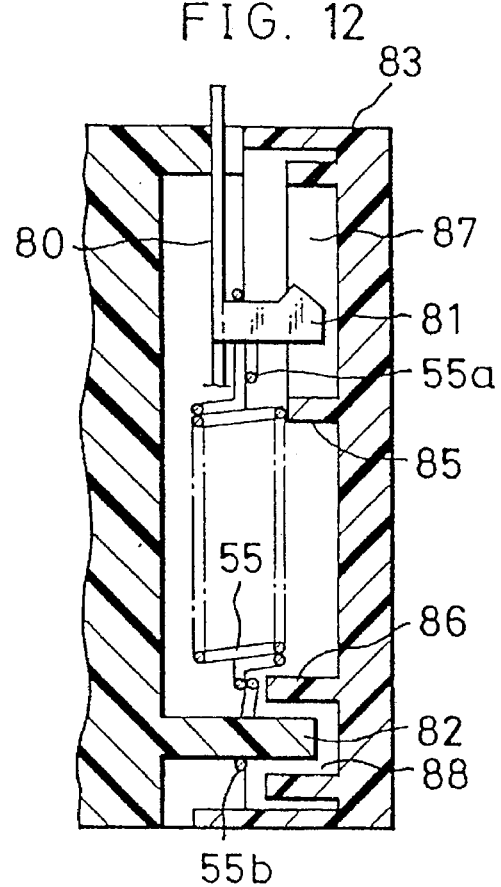
FIG. 12 is a cross sectional view of the shutter device according to a further embodiment of the present invention.
Figure 13:
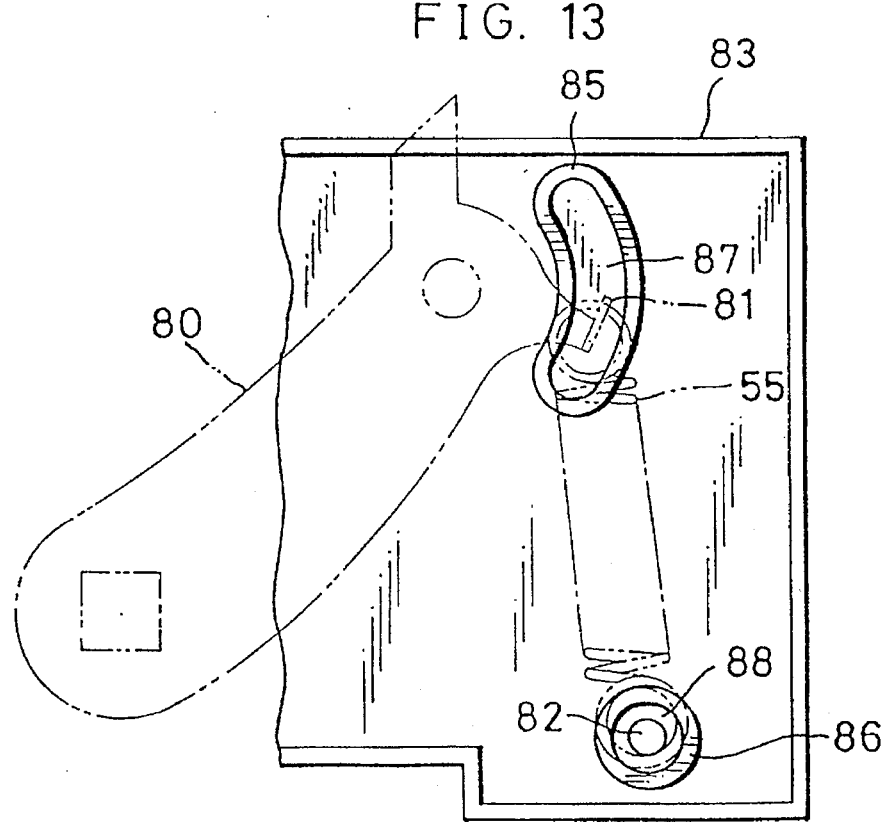
FIG. 13 is a rear view of the shutter cover shown in FIG. 12.
Figure 14:
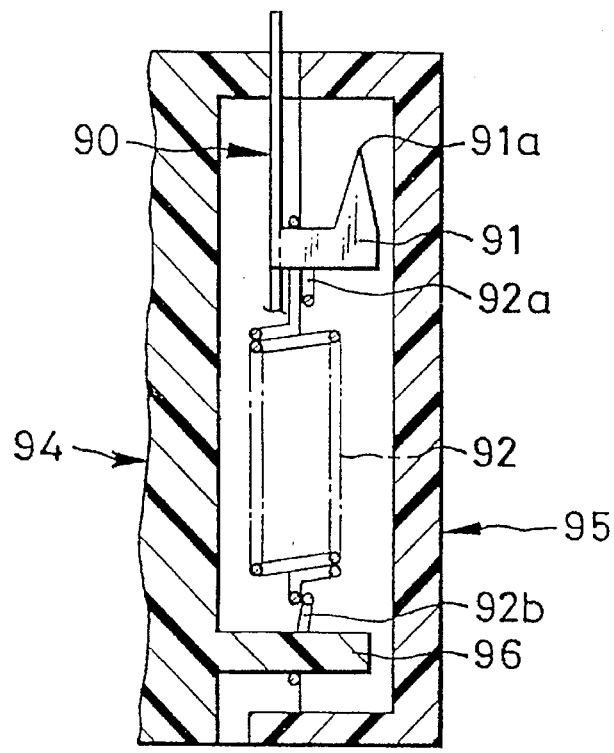
FIG. 14 is a cross sectional view illustrating a conventional mounting for the coil tension spring.
Figure 15:
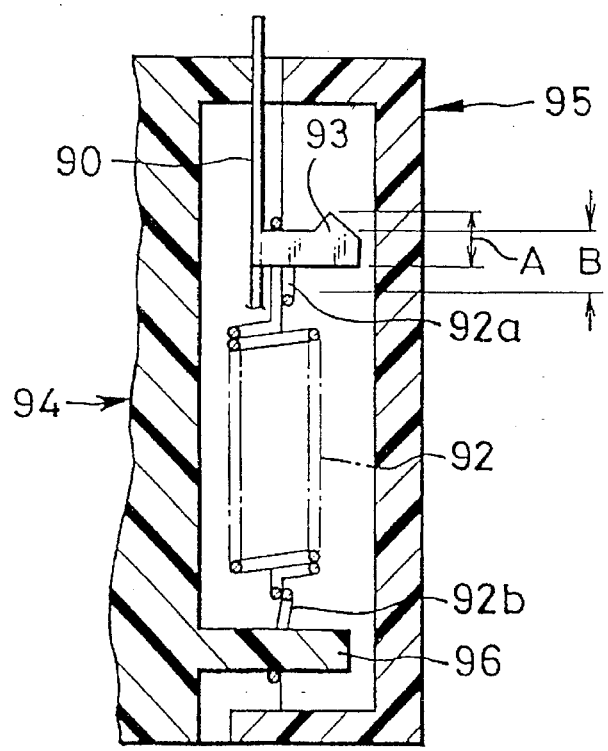
FIG. 15 is a cross sectional view like FIG. 14, showing another conventional mounting for the coil tension spring.

Instead of the groove 64, recess 66, or through-holes 73 and 74, fences 85 and 86 may be formed on a shutter cover 83 as shown in FIGS. 12 and 13, protruding from the shutter cover 83 to shield the path of a hook 81 of a shutter blade 80 and accommodate a pin 82. These fences 85 and 86 define recesses 87 and 88 whose widths are less than the outer diameters of the end portions 55a and 55b of spring 55.

In the above-described embodiments, the shape of the end portions of the coil spring is circular, but this shape may instead be ellipsoidal or triangular. Also, the shape of the pin 56 and recess 66 may be circular, rectangular, triangular, or the like.

Although the present invention has been fully described by way of preferred embodiments thereof with reference to the accompanying drawings, various changes and modifications will be apparent to those skilled in this field. Therefore, unless otherwise these changes and modifications depart from the scope of the present invention, they should be construed as being included therein.

What is claimed is:

1. A lens-fitted photographic film unit having a main body and a front cover attached to a front of said main body, said main body being preloaded with photographic film and provided with a shutter device mounted on a front of said main body behind said front cover, said lens-fitted photographic film unit comprising:

an access opening formed in said front cover for the insertion of a member causing said shutter device to move forcibly from a closed state to an open state and to hold said shutter device in said open state when said front cover is attached to said main body;

said shutter device comprising a shutter blade, said front cover being. disposed directly in front of and forwardly covering said shutter blade.

* * * * *